3,117,963
1-(α-PHENYLBENZYL)-OCTAHYDRO-1,5-
DIAZOCINE COMPOUNDS
Frederick F. Blicke, Ann Arbor, Mich., assignor to The
Regents of the University of Michigan, Ann Arbor,
Mich., a corporation of Michigan
No Drawing. Filed June 6, 1960, Ser. No. 33,919
15 Claims. (Cl. 260—239)

This invention pertains to novel chemical compounds, and to a process for preparing them. More particularly, the invention pertains to 1-(α-phenylbenzyl)-5-lower-alkyloctahydro-1,5-diazocine final products, to novel intermediates, and to a process for preparing said final products and intermediates.

The novel final products of this invention have the following general structural formula:

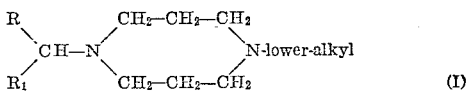

(I)

wherein R and $R_1$ re selected from the group consisting of phenyl and halophenyl radicals, and "lower-alkyl" is an alkyl radical of from 1 to 8 carbon atoms, inclusive, for example, methyl, ethyl, propyl, butyl, pentyl, hexyl, heptyl, octyl, and isomeric forms thereof.

The novel compounds of this invention, having the formula I above, can be prepared by several syntheses. They are prepared according to a preferred process of the invention by condensing a 1-lower-alkyloctahydro-1,5-diazocine with an α-phenylbenzyl halide. They are also prepared by reacting a 1-(α-phenylbenzyl)-octahydro-1,5-diazocine with a lower-alkyl halide.

In accordance with a preferred process for preparing the 1-(α-phenylbenzyl)-5-lower-alkyloctahydro-1,5-diazocines of this invention, a 1-lower-alkyloctahydro-1,5-diazocine, for example, 1-methyl-, 1-ethyl-, 1-isopropyl-, or 1-octyloctahydro-1,5-diazocine is reacted with an α-phenylbenzyl halide in the presence of an inert organic solvent medium for example, xylene, methyl ethyl ketone, benzene, toluene, and the like. Illustratively, the α-phenylbenzyl halide is benzhydryl chloride and bromide, p-chloro-α-phenylbenzyl chloride and bromide, p-iodo-α-phenylbenzyl chloride and bromide, p-fluoro-α-phenylbenzyl chloride and bromide, p,p'-dichloro-α-phenylbenzyl chloride and bromide, p-bromo-α-phenylbenzyl chloride and bromide, m-chloro-α-phenylbenzyl chloride and bromide, and the like. Stoichiometrically, the reaction requires one mole of the α-phenylbenzyl halide for each mole of the diazocine. The reactants can be mixed in equimolar proportions or an excess of either reactant can be used. Since one mole of hydrohalic acid is released by the condensation of one mole of the diazocine with one mole of the α-phenylbenzyl halides, it is preferable to use an excess of the diazocine or to include another acid acceptor in the reaction mixture. Suitable acid acceptors include triethylamine, sodium carbonate, pyridine, and the like. If one of the designated acid acceptors is not employed and the diazocine reactant is also the acid acceptor, it is desirable to use at least 1.5 moles, preferably about 2 moles, for each mole of the α-phenylbenzyl halide.

The reaction proceeds at temperatures ranging from about 25° C. to about 100° C. Preferably, the reaction is carried out in the range of about 40° C. to about 80° C.; frequently, it can be conveniently carried out at the reflux temperature of the mixture. After the reaction is complete, the 1-(α-phenylbenzyl)-5-lower-alkyloctahydro-1,5-diazocine having Formula I above is freed from the by-products of the reaction and any unreacted starting materials by conventional methods, illustratively, evaporation of the solvent medium, solvent extraction, distillation, and like procedures.

Alternatively, the compounds of the invention, having Formula I above, are prepared by reacting a 1-(α-phenylbenzyl)octahydro-1,5-diazocine with a lower-alkyl halide (e.g., methyl chloride, methyl bromide, ethyl bromide, butyl bromide, octyl bromide, and the like). The reaction can be carried out in the same manner as described above, and the product is recovered.

The novel 1-(α-phenylbenzyl)octahydro-1,5-diazocine intermediates of the invention are prepared by reacting an α-phenylbenzyl halide, of the kind indicated above, with an octahydro-1,5-diazocine wherein one of the nitrogen atoms is protected by a readily hydrolyzable group, for example, formyl, acetyl, butyryl, hexanoyl, heptanoyl, octanoyl, acrylyl, benzoyl, or like monocarboxacyl group. The reactants are mixed in the presence of an inert organic solvent, for example, methyl ethyl ketone, xylene, and the like. Stoichiometrically, the reaction requires one mole of the α-phenylbenzyl halide for each mole of the 1-acyloctahydro-1,5-diazocine. The reactants can be mixed in equimolar proportions or an excess of either reactant can be used. The hydrohalic acid produced by the reaction can be taken up by the diazocine reactant or by another acid acceptor which can be included in the reaction mixture. When the diazocine reactant is also the acid acceptor, it is desirable to use at least 2 moles, preferably about 2 to 2.5 moles, for each mole of the α-phenylbenzyl halide. On the other hand, the diazocine and the α-phenylbenzyl halide can be reacted in about equimolar proportions in the presence of another acid acceptor, for example, triethylamine, sodium carbonate, pyridine, and the like. The reaction can be carried out at temperatures ranging between about 35° C. and about 100° C., preferably between about 45° C. and about 80° C. The 1-(α-phenylbenzyl)octahydro-1,5-diazocine intermediate is then obtained from the 1-(α-phenylbenzyl)-5-acyloctahydro-1,5-diazocine thus produced by removing the salt of the hydrohalic acid produced in the reaction; hydrolyzing the 5-acyl group with an alkaline hydrolyzing agent, for example, sodium or potassium hydroxide, and the like; and separating the product by the usual techniques of solvent extraction, filtration, and distillation. Alternatively, when separation and recovery of the 1-(α-phenylbenzyl)-5-acyloctahydro-1,5-diazocine is desired, the same general procedure is followed, but omitting the step of alkaline hydrolysis.

The 1-acyloctahydro-1,5-diazocine intermediate is readily prepared by reacting octahydro-1,5-diazocine with an alkyl ester of a hydrocarbon monocarboxylic acid, illustratively, a lower-alkanoate or alkenoate, for example, ethyl formate, methyl acetate, ethyl butyrate, ethyl hexanoate, methyl heptanoate, ethyl octanoate, methyl acrylate, and the like, ethyl benzoate, and the like. Stoichiometrically, the reaction requires equimolar proportions of the octahydro-1,5-diazocine and the ester. Since any excess of the ester will contribute to formation of the undesired 1,5-diacyloctahydro-1,5-diazocine, it is generally preferable to use equimolar proportions or slightly less than 1 mole of ester for each mole of octahydro-1,5-diazocine. The monocarboxylic acid ester and the diazocine are mixed in an inert organic solvent, illustratively, methanol, ethanol, and the like, and heated. The solvent is then removed and the residue distilled to give the 1-acyloctahydro-1,5-diazocine.

The 1-lower-alkyloctahydro-1,5-diazocine intermediates can be produced by reducing the corresponding 1-lower-alkanoyloctahydro-1,5-diazocines. For example, the reduction is conveniently accomplished by heating the 1-lower-alkanoyl-octahydro-1,5-diazocine with lithium aluminum hydride in the presence of an inert organic solvent, illustratively, diethyl ether, tetrahydrofuran, dibutyl ether, and the like. The 1-lower-alkyloctahydro-1,5-diazocine is recovered by decomposing the reaction mixture according to conventional technique, filtering, evaporating the solvent, and distilling the residue.

Acid addition salts of the final products (Formula I, above) and intermediates of this invention are prepared by neutralizing the free base with a desired acid, illustratively, a pharmacologically acceptable organic or inorganic acid, for example, hydrochloric, hydrobromic, sulfuric, phosphoric, tartaric, citric, acetic, butyric, succinic, picric, quinic, and like acids.

The novel 1-($\alpha$-phenylbenzyl)-5-lower-alkyloctahydro-1,5-diazocines of the invention (Formula I, above) possess anti-tremor activity, and they can be administered to dogs in the treatment of chorea. They can also be administered to other mammals for the treatment of muscular spasms. Further, the final products and intermediates of the invention are useful in accordance with U.S. Patents 1,915,334 and 2,075,359 in preparing amine fluosilicate mothproofing agents.

When used in pharmaceutical formulations, the novel 1 - ($\alpha$ - phenylbenzyl) - 5 - lower - alkyloctahydro - 1,5-diazocines are preferably employed in the form of pharmacologically acceptable acid addition salts. Thus, a salt can be combined with solid or liquid pharmaceutical carriers and formulated in the form of tablets, powder packets, or capsules, using starch and like excipients, or dissolved or suspended in suitable solvents or vehicles for oral or parenteral administration.

The following examples are illustrative of the process and products of the present invention, but are not to be construed as limiting.

EXAMPLE 1

*Preparation of 1-Formyloctahydro-1,5-Diazocine*

To a refluxing solution of 171 g. (1.5 moles) of octahydro-1,5-diazocine (boiling point 78° to 80° C. at 16 mm. of mercury pressure) in 600 ml. of absolute methanol was added, dropwise with stirring, 111 g. (1.5 moles) of ethyl formate during an interval of 25 minutes. The reaction mixture was stirred at the reflux temperature for 4 hrs., and then the methanol was removed by distillation and the residue was fractionated by distillation at reduced pressure. There was thus obtained 186 g. (87% yield) of 1-formyloctahydro-1,5-diazocine having a boiling point of 153° to 156° C. at 12 mm. of mercury pressure.

*Analysis.*—Calculated for $C_7H_{14}N_2O$: C, 59.13; H, 9.92. Found: C, 58.93; H, 9.92.

EXAMPLE 2

*Preparation of 1-Methyloctahydro-1,5-Diazocine*

A solution of 114 g. (0.8 mole) of 1-formyloctahydro-1,5-diazocine in 400 ml. of ether was added, dropwise, to a suspension of 32 g. of lithium aluminum hydride in 2000 ml. of ether. This reaction mixture was stirred and refluxed for 24 hrs., and then 64 ml. of water was added, dropwise. Stirring and refluxing was continued for 5 hrs. and the reaction mixture was then filtered through a sintered glass funnel. The filter cake was washed with ether and the washings were combined with the filtrate. After evaporating the ether, the residue was distilled and 84 g. (82% yield) of 1-methyloctahydro-1,5-diazocine having a boiling point of 76° to 79° C. at 18 mm. of mercury pressure was recovered.

*Analysis.*—Calculated for $C_7H_{16}N_2$: C, 65.56; H, 12.58; N, 21.86. Found: C, 65.37; H, 12.16; N, 22.01.

EXAMPLE 3

*Preparation of 1-Acetyloctahydro-1,5-Diazocine*

A solution of 18.5 g. of methyl acetate (80% pure) in 20 ml. of absolute methanol was added, dropwise, to a stirred, refluxing solution of 22.8 g. (0.2 mole) of octahydro-1,5-diazocine in 80 ml. of absolute methanol. After refluxing the mixture for 16 hrs., the methanol was removed and the residue was distilled, yielding 20 g. (64% yield) of 1-acetyloctahydro-1,5-diazocine having a boiling point of 170° to 172° C. at 12 mm. of mercury pressure.

*Analysis.*—Calculated for $C_8H_{16}N_2O$: C, 61.50; H, 10.32. Found: C, 61.28; H, 10.39.

The picrate was prepared in ethanol. Recrystallization from aqueous ethanol gave 1-acetyloctahydro-1,5-diazocine picrate having a melting point of 182° to 183° C.

*Analysis.*—Calculated for $C_{14}H_{19}N_5O_8$: C, 43.64; H, 4.97. Found: C, 43.43; H, 4.89.

Following the same procedure but substituting ethyl propionate, methyl butyrate, ethyl valerate, propyl hexanoate, methyl heptanoate, methyl octanoate, methyl acrylate, and ethyl benzoate for methyl acetate, 1-propionyl-, 1-butyryl-, 1-valeryl-, 1-hexanoyl-, 1-heptanoyl-, 1-octanoyl-, 1-acrylyl-, and 1-benzoyloctahydro-1,5-diazocine, respectively, were prepared.

EXAMPLE 4

*Preparation of 1-Ethyloctahydro-1,5-Diazocine*

To a stirred suspension of 5 g. of lithium aluminum hydride in 250 ml. of ether there was added, dropwise, a solution of 19 g. of 1-acetyloctahydro-1,5-diazocine in 60 ml. of ether. The reaction mixture was refluxed with stirring for 19 hrs., and 10 ml. of water was then added, dropwise. The reaction mixture was filtered, the ether was evaporated from the filtrate, and the residue was distilled to obtain 16 g. (92% yield) of 1-ethyloctahydro-1,5-diazocine having a boiling point of 87° to 89° C. at 19 mm. of mercury pressure.

*Analysis.*—Calculated for $C_8H_{18}N_2$: C, 67.55; H, 12.75. Found: C, 67.63; H, 12.77.

In the same manner but substituting 1-butyryl-, 1-hexanoyl-, 1-heptanoyl-, and 1-octanoyloctahydro-1,5-diazocine for 1-acetyloctahydro-1,5-diazocine, 1-butyl-, 1-hexyl-, 1-heptyl-, and 1-octyloctahydro-1,5-diazocine, respectively, were prepared.

EXAMPLE 5

*Preparation of 1-(p-Chloro-$\alpha$-Phenylbenzyl)-5-Methyloctahydro-1,5-Diazocine and Dihydrochloride*

Part A.—Preparation of 1-(p-chloro-$\alpha$-phenylbenzyl)-5-methyloctahydro-1,5-diazocine A solution of 8.5 g. (0.066 mole) of 1-methyloctahydro-1,5-diazocine in 40 ml. of methyl ethyl ketone was heated with stirring at 45° C. while a solution of 9.4 g. (0.033 mole) of p-chloro-$\alpha$-phenylbenzyl bromide in 40 ml. of methyl ethyl ketone was added, dropwise. After continued heating at 50° to 55° C. for 4 hrs., the methyl ethyl ketone was removed by distillation under reduced pressure. The residue was mixed with 40 ml. of absolute ethanol and 5.6 g. (0.066 mole) of sodium bicarbonate, and the mixture was refluxed for 3 hrs. After cooling, the reaction mixture was filtered, and the ethanol was evaporated from the filtrate. The residue was distilled at reduced pressure, thus obtaining 7.0 g. of 1-(p-chloro-$\alpha$-phenylbenzyl)-5-methyloctahydro1,5-diazocine having a boiling point of 178° to 182° C. at 0.3 mm. of mercury pressure.

Part B.—Preparation of 1-(p-chloro-α-phenylbenzyl)-5-methyloctahydro-1,5-diazocine dihydrochloride The 1 - (p-chloro-α-phenylbenzyl)-5-methyloctahydro-1,5-diazocine prepared in Part A was dissolved in methanol, a methanolic solution of hydrogen chloride was added, and the mixture was evaporated to dryness. The residue was triturated with ether and filtered. There was thus obtained 8.4 g. (64% yield) of 1-(p-chloro-α-phenylbenzyl)-5-methyloctahydro-1,5-diazocine dihydrochloride. After recrystallization from absolute ethanol the melting point was 229° to 230° C.

*Anlysis.*—Calculated for $C_{20}H_{27}Cl_3N_2$: C, 59.78; H, 6.77; N, 6.97. Found: C, 59.58; H, 6.8; N, 7.00.

In a like manner the 1-(p-chloro-α-phenylbenzyl)-5-methyloctahydro-1,5-diazocine can be neutralized with hydrobromic, sulfuric, phosphoric, tartaric, citric, acetic, picric, butyric, quinic, and succinic acids, to form the corresponding hydrobromide, sulfate, phosphate, tartrate, citrate, acetate, picrate, butyrate, quinate, and succinate acid addition salts of 1-(p-chloro-α-phenylbenzyl)-5-methyloctahydro-1,5-diazocine.

EXAMPLE 6

*Preparation of 1-(p-chloro-α-Phenylbenzyl)-5-Methyloctahydro-1,5-Diazocine*

A mixture consisting of 47.4 g. (0.2 mole) of p-chloro-α-phenylbenzyl chloride, 25.6 g. (0.2 mole) of 1-methyloctahydro-1,5-diazocine, and 20.2 g. (0.2 mole) of triethylamine in 250 ml. of benzene was refluxed for 40 hrs. After the reaction mixture had cooled to about 25° C., it was filtered in order to remove precipitated triethylamine hydrochloride. The filtrate was extracted with dilute aqueous hydrochloric acid (1:10, i.e., one volume of 36–38% HCl and nine volumes of water), and the acid extract was made basic with approximately 10% aqueous sodium hydroxide solution. The basic solution was extracted with benzene, and the benzene extract was concentrated by distillation. The residual oil thus obtained was distilled, and 25.5 g. of 1-(p-chloro-α-phenylbenzyl)-5-methyloctahydro-1,5-diazocine having a boiling point of 166° to 168° C. at 0.1 to 0.05 mm. of mercury pressure was recovered.

*Analysis.*—Calculated for $C_{20}H_{25}ClN_2$: C, 73.08; H, 7.67; N, 8.52; Cl, 10.79. Found: C, 72.84; H, 8.08; N, 8.72; Cl, 10.82.

EXAMPLE 7

*Preparation of 1-(p-Chloro-α-Phenylbenzyl)Octahydro-1,5-Diazocine and Dipicrate*

A solution of 1-formyloctahydro-1,5-diazocine (56.8 g., 0.4 mole) in 250 ml. of methyl ethyl ketone was heated at 40° C. while a solution of 56.3 g. (0.2 mole) of p-chloro-α-phenylbenzyl bromide in 250 ml. of methyl ethyl ketone was added, dropwise with stirring, during an interval of 70 minutes. This reaction mixture was stirred and heated at 45° C. for 3.5 hours. It was then cooled and filtered. The filter-cake containing 1-formyloctahydro-1,5-diazocine hydrobromide was washed with methyl ethyl ketone. These washings were combined with the filtrate and the methyl ethyl ketone was removed under reduced pressure. The residue was mixed with ether and the mixture was filtered (filtrate A) to remove additional hydrobromide. The combined recovery of 1-formyl-octahydro-1,5-diazocine hydrobromide was 44.0 g.; the calculated amount was 44.6 g. Its melting point was 223° to 224° C.

The ether was removed from filtrate A, and the residual 1 - (p-chloro-α-phenylbenzyl)-5-formyloctahydro-1,5-diazocine was dissolved in 400 ml. of absolute ethanol. After the addition of 40 g. of potassium hydroxide pellets (85% pure), the mixture was refluxed for 24 hours. The reaction mixture was cooled and 70 ml. of absolute ethanol, into which hydrogen chloride had been passed until 12 g. of the gas had been absorbed, was added, dropwise. The mixture was filtered through a sintered glass funnel, the ethanol was removed, and 400 ml. of ether was added to the residue. The ether solution was filtered, and the filtrate was washed with water and dried over anhydrous potassium carbonate. The ether was evaporated and the residue was distilled. The 1-(p-chloro-α-phenylbenzyl)-octahydro-1,5-diazocine thus obtained had a boiling point of 178° to 181° C. at 0.3 mm. of mercury pressure and weighed 52.0 g. (82% yield). It soon solidified and a sample recrystallized from petroleum ether (boiling range 60° to 75° C.) melted at 67° to 68° C.

*Analysis.*—Calculated for $C_{19}H_{23}ClN_2$: C, 72.48; H, 7.36. Found: C, 72.28; H, 7.34.

1 - (p-chloro-α-phenylbenzyl)octahydro-1,5-diazocine was neutralized in water with picric acid; and after recrystallization from absolute ethanol, the dipicrate obtained melted at 176° to 177° C.

EXAMPLE 8

*Preparation of 1-(p-Chloro-α-Phenylbenzyl)-5-Ethyloctahydro-1,5-Diazocine and Dipicrate*

A solution of 14.1 g. (0.05 mole) of p-chloro-α-phenylbenzyl bromide in 50 ml. of methyl ethyl ketone was added, dropwise during a period of 40 min., to a stirred solution of 7.1 g. (0.05 mole) of 1-ethyloctahydro-1,5-diazocine and 5.6 g. (0.055 mole) of triethylamine in 50 ml. of methyl ethyl ketone. The reaction mixture was stirred for 12 hrs., refluxed for 1.5 hrs., cooled, and filtered. The methyl ethyl ketone was removed from the filtrate, and 100 ml. of ethyl was added to the residue. The ether mixture was filtered, the ether was removed, and the residue was distilled, yielding 10.2 g. (59% yield) of 1-(p-chloro-α-phenylbenzyl)-5-ethyloctahydro-1,5-diazocine having a boiling point of 172° to 176° C. at 0.3 mm. of mercury pressure.

The 1-(p-chloro-α-phenylbenzyl)-5-ethyloctahydro-1,5-diazocine was neutralized in ether with picric acid and after recrystallization from ethanol-acetone, the dipicrate had a melting point of 187° to 188° C.

*Analysis.*—Calculated for $C_{33}H_{33}ClN_8O_{14}$: C, 49.47; H, 4.15. Found: C, 49.70; H, 4.35.

Following the same procedure but substituting 1-butyl-, 1-hexyl-, 1-heptyl-, and 1-octyloctahydro-1,5-diazocine for 1-ethyloctahydro-1,5-diazocine, the corresponding 1-(p-chloro-α-phenylbenzyl) - 5-butyloctahydro-1,5-diazocine, 1-(p-chloro-α-phenylbenzyl)-5-hexyloctahydro - 1,5 - diazocine, 1-(p-chloro-α-phenylbenzyl) - 5 - heptyloctahydro-1,5-diazocine, and 1-(p-chloro-α-phenylbenzyl)-5-octyloctahydro-1,5-diazocine were prepared.

EXAMPLE 9

*Preparation of 1-(α-Phenylbenzyl)Octahydro-1,5-Diazocine and Dipicrate*

A solution of 28.4 g. (0.2 mole) of 1-formyloctahydro-1,5-diazocine and 30.3 g. (0.3 mole) of triethylamine in 250 ml. of methyl ethyl ketone was heated with stirring to 45° C. To this solution was then added, dropwise during an interval of 75 minutes, 61.8 g. (0.25 mole) of α-phenylbenzyl bromide dissolved in 250 ml. of methyl ethyl ketone. The temperature of the reaction mixture was maintained at 47° to 48° C. during the addition of the α-phenylbenzyl bromide, and the same temperature was maintained for an additional 18 hours. The reaction mixture was then refluxed for 2 hrs., cooled, and filtered. After removing the methyl ethyl ketone from the filtrate, the residue was mixed with 500 ml. of ether. The ether mixture was filtered, and the ether was removed from the filtrate. The resulting 1-(α-phenylbenzyl)-5-formyloctahydro-1,5-diazocine was dissolved in 400 ml. of ethanol, 40 g. of potassium hydroxide (85% pure) was added, and the mixture was refluxed for 24 hrs. The mixture was cooled, and 70 ml. of absolute ethanol containing 12 g. of hydrogen chloride was added, dropwise. After filtering, the alcohol was removed under reduced pressure and the residue was taken up in 400 ml. of ether. The ether mixture was filtered, and an excess of ethereal hydrogen chloride was added to the filtrate in order to precipitate the dihydrochloride. The hygroscopic dihydrochloride was recovered on a filter and dissolved in 200 ml. of absolute ethanol. After 84 g. of sodium bicarbonate was added, the mixture was refluxed for 6 hrs. After filtering, the ethanol was removed from the filtrate, and the residue was treated with 800 ml. of absolute ether and filtered. After concentrating the filtrate to a small volume, 40 g. (71% yield) of the product separated. The 1-(α-phenylbenzyl)octahydro-1,5-diazocine thus obtained had a melting point of 117° to 118° C. after recrystallizing from petroleum ether (boiling range 60° to 75° C.).

*Analysis.*—Calculated for $C_{19}H_{24}N_2$: C, 81.38; H, 8.63. Found: C, 81.67; H, 8.74.

On neutralizing with picric acid in ethanol and recrystallizing from aqueous ethanol the dipicrate having a melting point of 180° to 181° C. was obtained.

*Analysis.*—Calculated for $C_{31}H_{30}N_8O_{14}$: C, 50.41; H, 4.09. Found: C, 50.43; H, 4.12.

EXAMPLE 10

*Preparation of 1-(p,p'-Dichloro-α-Phenylbenzyl)-5-Methyloctahydro-1,5-Diazocine and Dihydrochloride*

Following the procedure of Example 5, but substituting p,p'-dichloro-α-phenylbenzyl chloride for p-chloro-α-phenylbenzyl bromide, 1-(p,p'-dichloro-α-phenylbenzyl)-5-methyloctahydro-1,5-diazocine and the dihydrochloride thereof were prepared.

EXAMPLE 11

*Preparation of 1-(p-Iodo-α-Phenylbenzyl)-5-Methyloctahydro-1,5-Diazocine and Dihydrochloride*

Following the procedure of Example 5, but substituting p-iodo-α-phenylbenzyl chloride for p-chloro-α-phenylbenzyl bromide, 1-(p-iodo-α-phenylbenzyl)-5-methyloctahydro-1,5-diazocine and the dihydrochloride thereof were prepared.

EXAMPLE 12

*Preparation of 1-(o-Chloro-α-Phenylbenzyl)-5-Methyloctahydro-1,5-Diazocine and Dihydrochloride*

Following the procedure of Example 5, but substituting o-chloro-α-phenylbenzyl chloride for p-chloro-α-phenylbenzyl bromide, 1-(o-chloro-α-phenylbenzyl)-5-methyloctahydro-1,5-diazocine and the dihydrochloride thereof were prepared.

EXAMPLE 13

*Preparation of 1-(p-Fluoro-α-Phenylbenzyl)-5-Methyloctahydro-1,5-Diazocine and Dihydrochloride*

Following the procedure of Example 5, but substituting p-fluoro-α-phenylbenzyl chloride for p-chloro-α-phenylbenzyl bromide, 1-(p-fluoro-α-phenylbenzyl)-5-methyloctahydro-1,5-diazocine and the dihydrochloride thereof were prepared.

EXAMPLE 14

*Preparation of 1-(p-Bromo-α-Phenylbenzyl)-5-Methyloctahydro-1,5-Diazocine and Dihydrochloride*

Following the procedure of Example 5, but substituting p-bromo-α-phenylbenzyl chloride for p-chloro-α-phenylbenzyl bromide, 1-(p-bromo-α-phenylbenzyl)-5-methyloctahydro-1,5-diazocine and the dihydrochloride thereof were prepared.

EXAMPLE 15

*Preparation of 1-(m-Chloro-α-Phenylbenzyl)-5-Methyloctahydro-1,5-Diazocine and Dihydrochloride*

Following the procedure of Example 5, but substituting m-chloro-α-phenylbenzyl chloride for p-chloro-α-phenylbenzyl bromide, 1-(m-chloro-α-phenylbenzyl)-5-methyloctahydro-1,5-diazocine and the dihydrochloride thereof were prepared.

EXAMPLE 16

*Preparation of 1-(α-Phenylbenzyl)-5-Butyloctahydro-1,5-Diazocine and Dihydrochloride*

Following the procedure of Example 5, but substituting butyl bromide for p-chloro-α-phenylbenzyl bromide, and substituting 1-(α-phenylbenzyl)octahydro-1,5-diazocine for 1-methyloctahydro-1,5-diazocine, 1-(α-phenylbenzyl)-5-butyloctahydro-1,5-diazocine and the dihydrochloride thereof were prepared

EXAMPLE 17

Ten thousand (10,000) scored tablets for oral use, each containing 10 mg. of 1-(p-chloro-α-phenylbenzyl)-5-methyloctahydro-1,5-diazocine dihydrochloride, are prepared from the following types and amounts of ingredients:

| | Grams |
|---|---|
| 1 - (p - chloro - α - phenylbenzyl) - 5 - methyloctahydro-1,5-diazocine dihydrochloride | 100 |
| Starch USP | 170 |
| Talc USP | 130 |
| Lactose USP | 2600 |
| Sucrose powder USP | 37 |
| Ascorbic acid | 100 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 0.5 to 2 tablets 1 to 3 times a day for the control of muscular spasms.

I claim:

1. Compound selected from the group consisting of (1) compounds having the following structural formula

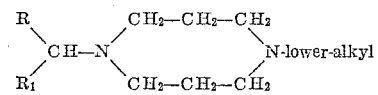

wherein R and $R_1$ are selected from the class consisting of phenyl and monohalophenyl, and (2) acid addition salts thereof.

2. 1 - (p - chloro - α - phenylbenzyl) - 5 - lower - alkyloctahydro-1,5-diazocine.

3. 1 - (p - chloro - α - phenylbenzyl) - 5 - methyloctahydro-1,5-diazocine.

4. 1 - (p - chloro - α - phenylbenzyl) - 5 - ethyloctahydro-1,5-diazocine.

5. 1 - (p - chloro - α - phenylbenzyl) - 5 - methyloctahydro-1,5-diazocine dihydrochloride.

6. 1 - (p - chloro - α - phenylbenzyl) - 5 - ethyloctahydro-1,5-diazocine dipicrate.

7. Compound selected from the group consisting of (1) compounds having the following structural formula

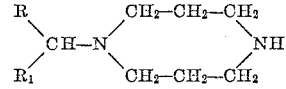

wherein R and $R_1$ are selected from the class consisting of phenyl and monohalophenyl, and (2) acid addition salts thereof.

8. 1 - (p - chloro - α - phenylbenzyl)octahydro - 1,5-diazocine.

9. 1-(α-phenylbenzyl)octahydro-1,5-diazocine.

10. 1 - (p - chloro - α - phenylbenzyl)octahydro - 1,5-diazocine dipicrate.

11. 1 - (α - phenylbenzyl)octahydro - 1,5 - diazocine dipicrate.

12. Compound 1 - (α - monohalophenylbenzyl) - 5 - lower-alkyloctahydro-1,5-diazocine.

13. Compound 1-(α-monohalophenylbenzyl)-5-loweralkyloctahydro-1,5-diazocine pharmacologically acceptable acid addition salt.

14. Compound 1-(α-monohalophenylbenzyl)octahydro-1,5-diazocine.

15. Compound 1-(α-monohalophenylbenzyl)octahydro-1,5-diazocine pharmacologically acceptable acid addition salt.

References Cited in the file of this patent

UNITED STATES PATENTS

| | | |
|---|---|---|
| 1,915,334 | Salzberg et al. | June 27, 1933 |
| 2,075,359 | Salzberg et al. | Mar. 30, 1937 |
| 2,655,498 | Weston et al. | Oct. 13, 1953 |

OTHER REFERENCES

Richter: Organich Chemistry, vol. 4, page 5 (1947).